(12) United States Patent
Zimmerman et al.

(10) Patent No.: US 8,833,030 B2
(45) Date of Patent: Sep. 16, 2014

(54) COMPRESSION BLOCKING BRACE BRACKET AND METHOD OF USE

(71) Applicant: SR Systems, LLC, Tuscaloosa, AL (US)

(72) Inventors: Steven Zimmerman, Linden, AL (US); Van T. Walworth, Lebanon, TN (US)

(73) Assignee: SR Systems, LLC, Tuscaloosa, AL (US)

( * ) Notice: Subject to any disclaimer, the term of this patent is extended or adjusted under 35 U.S.C. 154(b) by 0 days.

(21) Appl. No.: 13/850,773

(22) Filed: Mar. 26, 2013

(65) Prior Publication Data

US 2013/0247499 A1 Sep. 26, 2013

Related U.S. Application Data

(60) Provisional application No. 61/685,795, filed on Mar. 26, 2012.

(51) Int. Cl.
- *E04B 1/38* (2006.01)
- *E04B 1/41* (2006.01)
- *E04B 1/26* (2006.01)
- *E04C 3/02* (2006.01)

(52) U.S. Cl.
CPC .................. *E04B 1/40* (2013.01); *E04B 1/2608* (2013.01); *E04C 2003/026* (2013.01)
USPC .......... 52/702; 52/582.1; 52/655.1; 52/282.5; 52/281; 403/232.1; 248/300

(58) Field of Classification Search
USPC .......... 52/582.1, 281–282.5, 665, 655.1, 712, 52/217, 317, 289, 702; 248/300, 500; 403/232.1, DIG. 15
See application file for complete search history.

(56) References Cited

U.S. PATENT DOCUMENTS

| | | | | |
|---|---|---|---|---|
| 2,477,163 A | * | 7/1949 | Barnett | 403/205 |
| 2,911,690 A | * | 11/1959 | Sanford | 403/232.1 |
| 3,188,696 A | * | 6/1965 | Earhart | 52/241 |
| 3,256,030 A | * | 6/1966 | Banse | 403/400 |
| 3,537,221 A | * | 11/1970 | Helfman et al. | 52/289 |
| 3,669,480 A | * | 6/1972 | Fugate | 403/400 |
| 3,967,908 A | * | 7/1976 | Snow et al. | 403/219 |
| 4,198,175 A | * | 4/1980 | Knepp et al. | 403/191 |
| 4,498,801 A | | 2/1985 | Gilb | |
| 4,561,230 A | * | 12/1985 | Rionda et al. | 52/289 |
| 4,572,695 A | | 2/1986 | Gilb | |
| 4,594,017 A | * | 6/1986 | Hills | 403/6 |
| 5,150,982 A | | 9/1992 | Gilb | |
| 5,186,571 A | * | 2/1993 | Hentzschel | 403/231 |

(Continued)

OTHER PUBLICATIONS

International Search Report for PCT/US2013/033897 mailed Jul. 12, 2013.

(Continued)

*Primary Examiner* — Robert Canfield
*Assistant Examiner* — Babajide Demuren
(74) *Attorney, Agent, or Firm* — Harness, Dickey & Pierce, P.L.C.

(57) ABSTRACT

A subassembly is positioned transverse in between two adjacent roof elements or wall elements. The subassembly includes a bracket; a construction element; and a fastener securing the bracket to the construction element. An extension tab of the bracket extends over a top surface of a roof element or a wall element. Multiple ones of the brackets installed in a roof element or a wall element define a line of compression blocking.

9 Claims, 6 Drawing Sheets

(56) References Cited

U.S. PATENT DOCUMENTS

| | | | |
|---|---|---|---|
| 5,551,200 A * | 9/1996 | Krug | 52/696 |
| 5,697,725 A | 12/1997 | Ballash et al. | |
| 6,209,268 B1 * | 4/2001 | Schmidt | 52/92.1 |
| 6,332,299 B1 * | 12/2001 | Stewart, III | 52/696 |
| 7,559,519 B1 * | 7/2009 | Dragic et al. | 248/300 |
| 8,061,088 B2 * | 11/2011 | Walker | 52/92.2 |
| 2005/0155314 A1 * | 7/2005 | Banta | 52/720.1 |

OTHER PUBLICATIONS

Written Opinion of the International Searching Authority for PCT/US2013/033897 mailed Jul. 12, 2013.

* cited by examiner

COMPRESSION BLOCKING BRACE BRACKET AND METHOD OF USE

CROSS-REFERENCE TO RELATED APPLICATIONS

This application claims the benefit of U.S. Provisional Application No. 61/685,795, filed on Mar. 26, 2012. The entire disclosure of the above application is incorporated herein by reference.

FIELD

The present disclosure relates to blocking braces used in the construction industry as transverse construction elements to establish parallelism and stabilization of a wall and/or roof system, in particular frame-type construction as typically used in residential and light commercial buildings.

BACKGROUND

This section provides background information related to the present disclosure which is not necessarily prior art.

In typical frame-type construction, buildings are constructed using stud type walls covered with sheeting of some kind. Many roof systems are constructed using rafters and joists built in place, cut to fit on the job site. As each rafter is fitted into place, the builder must take appropriate measures to stabilize each rafter. In typical frame-type construction of roof systems using truss elements, prefabricated trusses are erected as part of a roof system. Trusses are generally simple frame lumber held together with stamped nail plates at the joints of the truss. As a result, the truss assembly is relatively limber. Builders must exercise care in handling, moving, and erecting prefabricated truss assemblies to prevent them from being damaged. After the trusses are set in place, builders must go to rather elaborate efforts to brace the limber trusses from toppling over like dominoes.

In roof systems constructed using prefabricated trusses or rafters built on site, it is important and necessary for the wall studs to be parallel to each other. It is also important and necessary for trusses and rafters to be parallel to each other. After installing prefabricated trusses or built in place rafters, builders install roof decking. Typical decking is made of sheets of plywood type materials. Another typical roof decking material is metal sheeting. The builder is further faced with a problem with limber trusses because the trusses are very difficult to install and stabilize in a straight position to ensure proper alignment and spacing to accommodate nailing patterns set to standard 16" or 24" offsets from each other. As a result, the builder must reposition trusses and/or rafters in an attempt to align the nailing patterns.

A standard benefit and feature of transverse blocking, which is often required for frame-type roof construction in extreme wind zones, is that the blocking provides a continuous line of compression resistance. When strong winds blow against the gable-end of the frame-type construction, the gable will respond to the wind by transferring the wind force throughout the roof system from truss to truss and/or from rafter to rafter. If the transferred wind force is sufficient, the gable-end may rupture and collapse, followed soon after by the collapse of one or more trusses, rafters, and/or roof decking.

SUMMARY

This section provides a general summary of the disclosure, and is not a comprehensive disclosure of its full scope or all of its features.

The present disclosure provides a blocking brace bracket element used in the construction of frame-type walls and roof systems. In roofing systems, the present invention enhances the method of construction and the effective strength of trusses, rafters, joists, engineered beams, and similar roof elements used on residential homes and other buildings. The enhanced strength applied to the roof construction system and/or a wall construction system is particularly useful in resisting the destructive forces from wind storms and seismic events.

The present disclosure also provides an improved construction method for the installation and stabilization of rafters built in place, by using a transverse oriented blocking brace installed using a specialized bracket, saving the builder time and money, and enhancing the method of construction and the effective strength of the walls. The present disclosure further provides an improved installation method for blocking braces and improves the resulting strength of the construction.

The present disclosure provides an improved method to align rafters and trusses so that nailing patterns of roof decking and sheeting on standard centers is accomplished, by using a transverse oriented blocking brace installed using a specialized bracket, saving the builder time and money.

Another problem builders face when installing blocking between trusses and rafters is that care must be taken to ensure that the blocking does not break the plane of the roof above the rafter or truss and interfere with the roof decking that will be subsequently applied. If the roof sheeting is applied over the top of blocking that is pronounced above the plane of the rafters or trusses, then the roof decking will be uneven and more prone to wind damage. The present disclosure overcomes this problem by providing a specialized bracket with locating tabs to properly set the relative level of the blocking brace to be flush with the roof line.

Frame-type roof systems which are subjected to extreme wind forces require additional strength to resist damage. One common type of damage roof systems experience during extreme wind events is that the roof decking and sheeting separates from the rafters and trusses. One of the known construction practices to minimize this separation is to provide blocking, fastened transverse to the trusses and rafters, located under the mating joints and edges of adjacent sheets of roof decking. Blocking is an expensive and time consuming effort for builders because the trusses and rafters neither are straight nor are they aligned parallel to each other, nor are they spaced properly or consistently from each other. Therefore, each blocking element must be individually measured and cut to fit for each location in the roof system. The present disclosure provides an improved method of installation and stabilization of the trusses and rafters while at the same time also providing for consistent parallel spacing of the trusses and rafters, so that standard nailing and fastening of roof decking at edges to blocking, fastened transverse to rafters and trusses, can be accomplished more easily, saving the builder time and money.

A series of blocking fastened transverse to the trusses and rafters effectively forms a continuous line of resistance, which goes into compression as wind force is applied against the gable-end. The present disclosure not only provides an improved method of installation for this line of compression blocking, saving the builder time and money, but the specialized bracket also provides the resulting line of compression blocking with enhanced strength to resist damaging winds because of the improved fastening points provided by the specialized bracket to secure the blocking brace to the rafters or trusses.

Frame-type interior and exterior walls often require a brace or blocking between vertical studs, especially in relatively tall wall constructions over eight feet high. When builders install blocking braces in between vertical studs, they encounter difficulty to install the blocking in such a way that does not protrude and break the plane of the wall and interfere with the wall sheeting which will be subsequently applied. The present disclosure overcomes this problem by providing a specialized bracket with locating tabs to properly set the relative level of the blocking brace to be flush with the plane of the wall sheeting.

When a frame-type construction is subjected to torsion or twisting forces like those brought about in severe wind storm events like tornados or hurricanes, the present disclosure provides resistance to destructive torsion forces because of the improved fastening points provided by the specialized bracket. The fastening points are positioned straddle the blocking brace, which significantly enhances the strength of the connection between the blocking brace and the construction element it is fastened to, therefore increasing resistance to destructive torsion forces.

When a frame-type construction is subjected to seismic forces like those brought about in severe wind storm events like tornados and/or seismic forces brought about by earthquakes, bracket assemblies of the present disclosure provide resistance to destructive seismic forces because of the improved fastening points provided by the specialized bracket. The fastening points are positioned straddle the blocking brace, which significantly enhances the strength of the connection between the blocking brace and the construction element it is fastened to, therefore increasing resistance to destructive seismic forces.

The present disclosure provides the user with a novel method of use improving standard construction techniques. The method of use is demonstrated by the contractor being able to layout the roof construction of a typical frame building using typical methods such as constructing the wall on the floor and then raising the wall section up into place. Rafters and/or trusses are then set in place according to measured locations. Typical construction practices and experience includes difficulties with maintaining rafter and joist spacing as roof decking is applied. The present disclosure provides a device that gives contractors improved ability to maintain truss spacing and stability during application of decking. The present disclosure takes advantage of the practice of precutting a blocking brace and then fastening a specialized bracket to the ends of the blocking brace to form a subassembly. The blocking brace subassembly is then easily and consistently located between adjacent trusses or rafters to establish parallel spacing. The ease of installation of the blocking brace subassembly is accomplished because the specialized bracket includes tabs that allow the blocking bracket subassembly to be set into place, freeing the hands of the builder to apply fastening devices. The tabs also provide convenient alignment edges to assist in proper placement to ensure that the blocking brace subassembly will be properly located under the edge of roof decking. The specialized tabs provide a series of fastening holes such that a first hole allows the blocking brace subassembly to be tacked into place for the purposes of alignment of the trusses and rafter elements, while a second series of holes is provided for firm enhanced strength fastening between the blocking brace subassembly and the roof system.

In construction applications where an engineered beam is being used as a flooring joist, it is common for a blocking brace to be installed between adjacent floor joist beams. In such cases, the present disclosure provides an improved installation method for builders because of the specialized bracket, which also provides improved strength to the floor system to resist torsion and other destructive forces.

The present disclosure effectively helps to unitize the frame-type structural components connected through the specialized bracket to further enhance the integral strength of the construction beyond what was possible without the benefits of the present disclosure.

In buildings which were constructed without the use of blocking braces in the roof system, the specialized brackets of the present disclosure provide an improved method of installation of blocking braces as a retrofit of the roof system to add enhanced strength to the roof system. The specialized brackets can be securely fastened to a precut blocking brace and positioned against the underside of roof decking and in between adjacent rafters or trusses to provide integral compression blocking support to the roof system, effectively helping to unitize a preexisting roof construction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
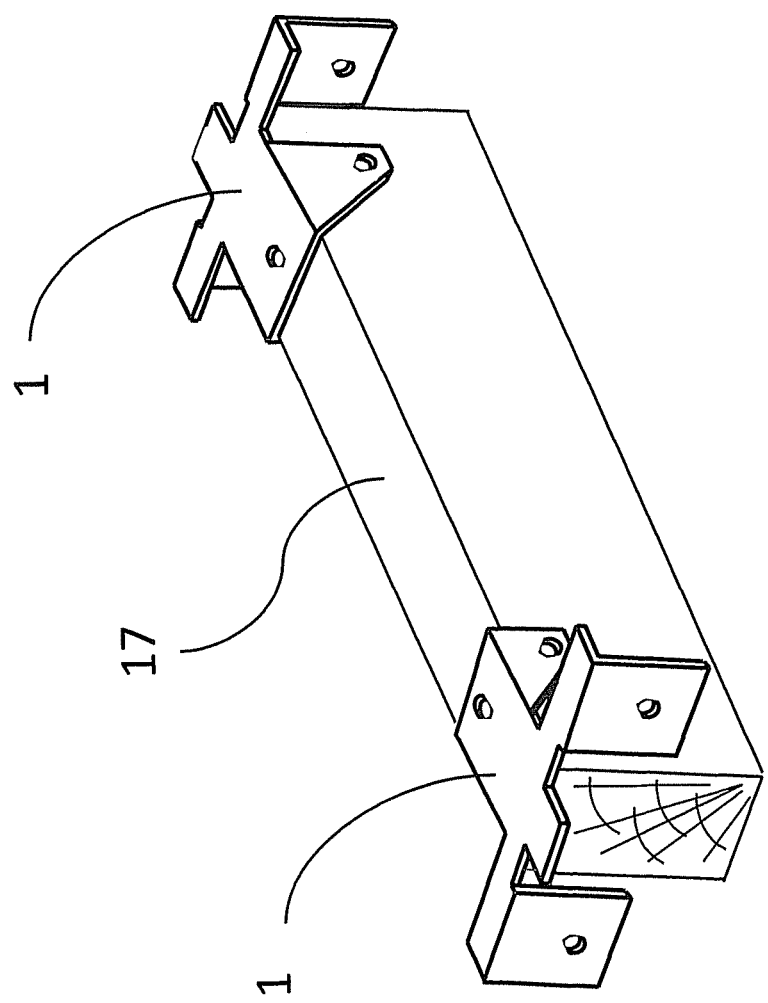
FIG. 1 is a front perspective view of a blocking brace subassembly consisting of two blocking brace brackets assembled on the ends of a typical 2×4 wood blocking brace.

Referring to FIG. 1, two blocking brace brackets 1 are assembled on a typical precut 2×4 type wood construction element 17. Wood element 17 is normally toe nailed in place between trusses or rafters in a roof system, or toe nailed between vertical studs in a wall system. Brackets 1 can be made using any of the stamping, laser cutting, bending, forming, casting, welding, or molding methods commonly used to fabricate similar products.

Typically, two brackets 1 will be assembled on each end of a precut construction element 17. Most of the time, blocking braces 17 are made using 2×4 material, but the preferred embodiments of the present disclosure are not limited to receiving a 2×4 material; rather, the blocking brace material can be any typical 2×4, 2×6, 2×8, 2×10, or 2×12 material. Those skilled in the art will readily appreciate that the blocking bracket design is not limited to 2×4 type materials since specialized embodiments of the present disclosure can be designed and manufactured to receive thicker blocking elements such as 4×4 type materials, or thinner blocking elements such as 1×4 type elements, or any other thickness as may be appropriate to a specific application, all of which maintain the spirit of the embodiments of the present disclosure detailed in the drawings.

Referring to FIG. 2 and again to FIG. 1, according to several embodiments, brackets 1 include a top flange portion 7 which spans the blocking brace and provides two transverse tabs 3, 3' (oriented transverse to top flange portion 7), each fitted with at least one through hole 4. Top flange portion 7 also provides for transverse tabs 5 and 13 (also oriented transverse to top flange portion 7), having through holes 8 and 9, respectively. Blocking brace 17 will fit into a receiving channel 6 formed by flange portion 7 and transverse tabs 5 and 13. The blocking brace 17 will be secured to bracket 1 using fasteners applied through holes 8, 9, and 2. Holes 8 and 9 are offset as indicated by alignment axes 10 and 11. The offset alignment axes allow for use of nails and/or screws to fasten bracket 1 securely, without the fasteners applied from opposite sides interfering with each other. The blocking bracket embodiment shown in FIG. 2 is suitable for new construction and/or for retrofit construction.

Figure 2:
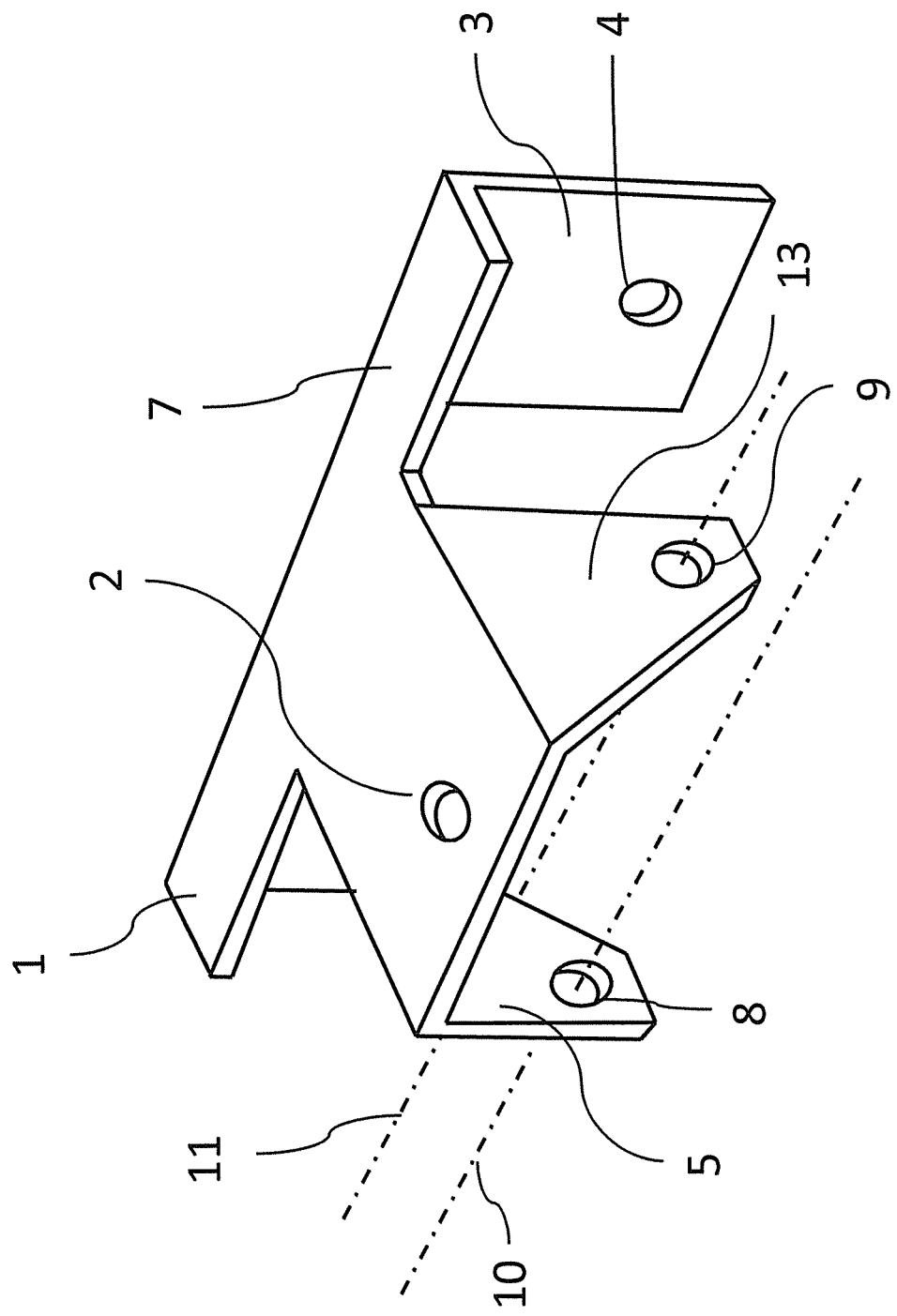
FIG. 2 is a perspective view of an embodiment of the present disclosure suitable for new construction and for retrofit construction.

Referring to FIG. 3 and again to FIGS. 1 and 2, according to several aspects, a bracket 12 modified from bracket 1 retains flange portion 7 providing transverse tabs 5, 13 with their respective holes 2, 8, and 9. This aspect includes an extension tab 14 which extends over a top or end edge surface of a roof element or a wall element which will be described in greater detail with respect to FIGS. 5 and 6. Extension tab 14 makes this aspect more applicable for new construction than retrofit applications because in new construction, the roof decking and/or wall sheeting has not been installed at the point in time that blocking brace subassemblies are being installed. Extension tab 14 allows the builder to set a blocking brace subassembly in between two installed trusses or rafters and effectively be "hands free" to fasten the subassembly because the subassembly will be self-supported in place prior to fastening via extension tabs 14.

Figure 3:
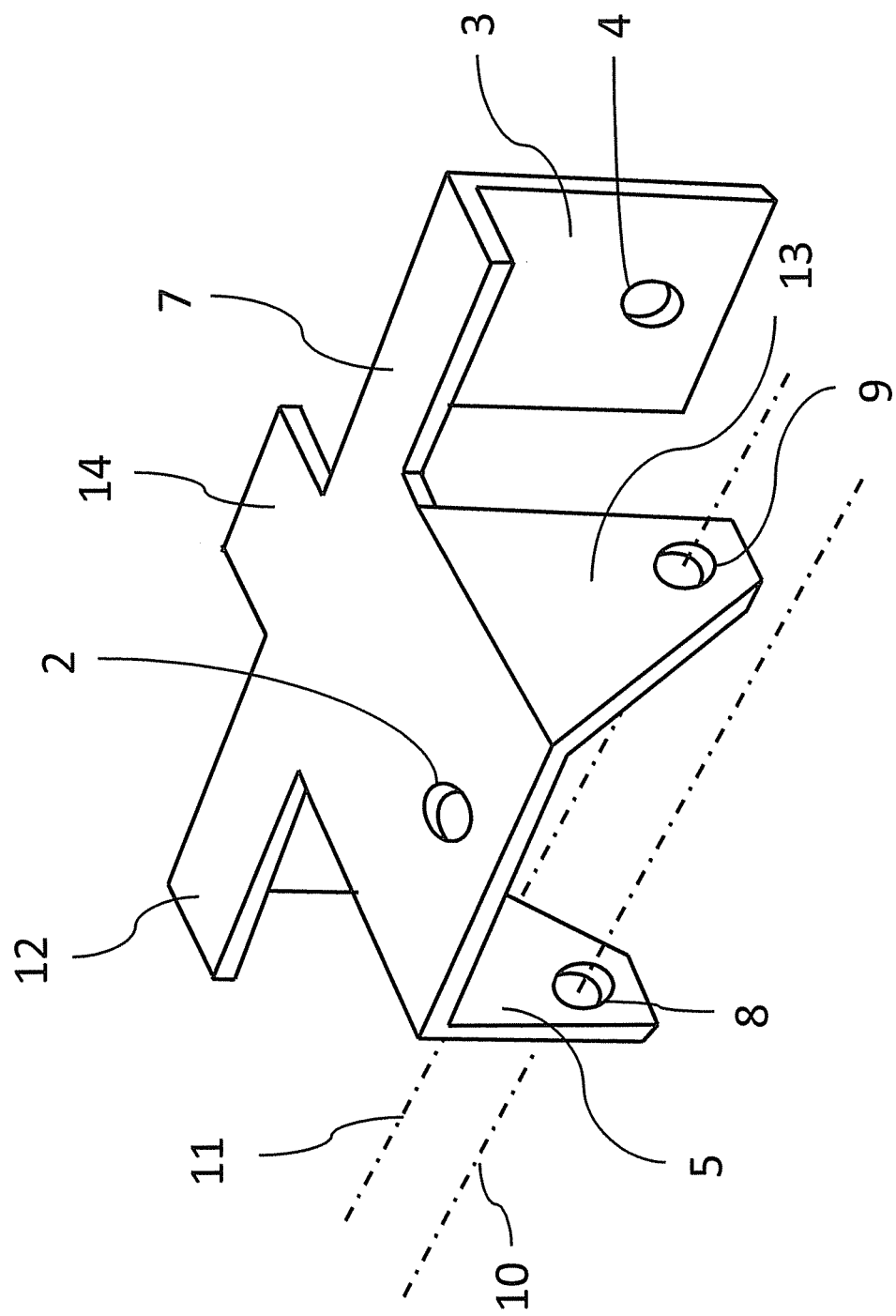
FIG. 3 is a perspective view of a further embodiment of the present disclosure with a tab.

Referring to FIG. 4 and again to FIG. 3, opposed mirror image first and second brackets 12 are presented as they would appear in a construction application. Blocking braces 17 and roof elements 16 are not shown for clarity. Alignment axes 10 and 11 are shown offset for fastening holes 8 and 9, while an alignment axis 15 passes through both fastening holes 4 in oppositely positioned transverse tabs 3. The reason alignment axis 15 is not offset through the roof element is so that a bolted fastener can be used through fastening holes 4 and through the roof element to form a substantially strong line of compression blocking. Nails and/or screws are suitable for securing bracket 12 to the blocking brace and therefore requires offset holes, but a bolted fastener is used for enhanced compression blocking, thereby requiring aligned fastening holes.

Figure 5:
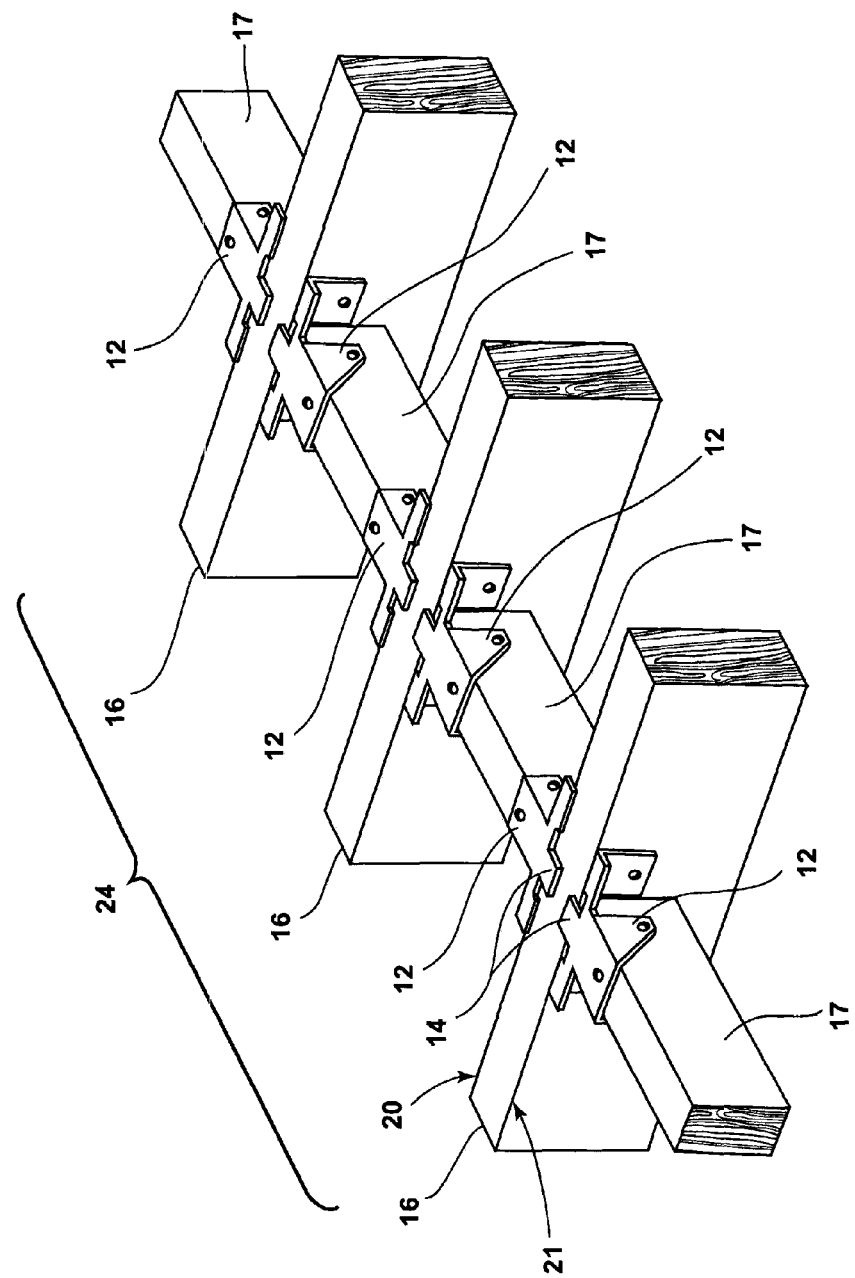
FIG. 5 is a top perspective view of a series of blocking brace subassemblies installed in a roof system to form a line of compression blocking.

Referring to FIG. 5, multiple roof elements 16 are installed adjacent to each other and spaced parallel with respect to each other as established and maintained by the blocking brace subassemblies comprised of blocking braces 17 and blocking brace brackets 12. Blocking brace brackets 12 are fastened to the blocking braces 17 and roof elements 16. Each extension tab 14 of the brackets 12 directly contacts an upper or first surface 20 of one of the roof elements 16 and therefore extends past an edge face or second surface 21 of one of the roof elements 16. Opposing brackets 12, 12' can have their extension tabs 14, 14' in direct contact with the same upper or first surface 20. The full assembly of blocking brace subassemblies forms a line of compression blocking 24, which greatly enhances the integral strength of the roof system, especially when using a bolted fastener through two blocking brace brackets 12 and the roof element 16 to effectively unitize these elements of a roof system. The enhanced integral strength imparted to the roof provides improved resistance to damaging wind storm forces and also resistance to the damaging effects of seismic forces. Bolted fasteners maintain integral strength in the construction that nails and screws are not able to provide. The present disclosure provides for a bolted fastener at the proper location in blocking brace applications to enhance the integral strength of the construction.

Figure 4:
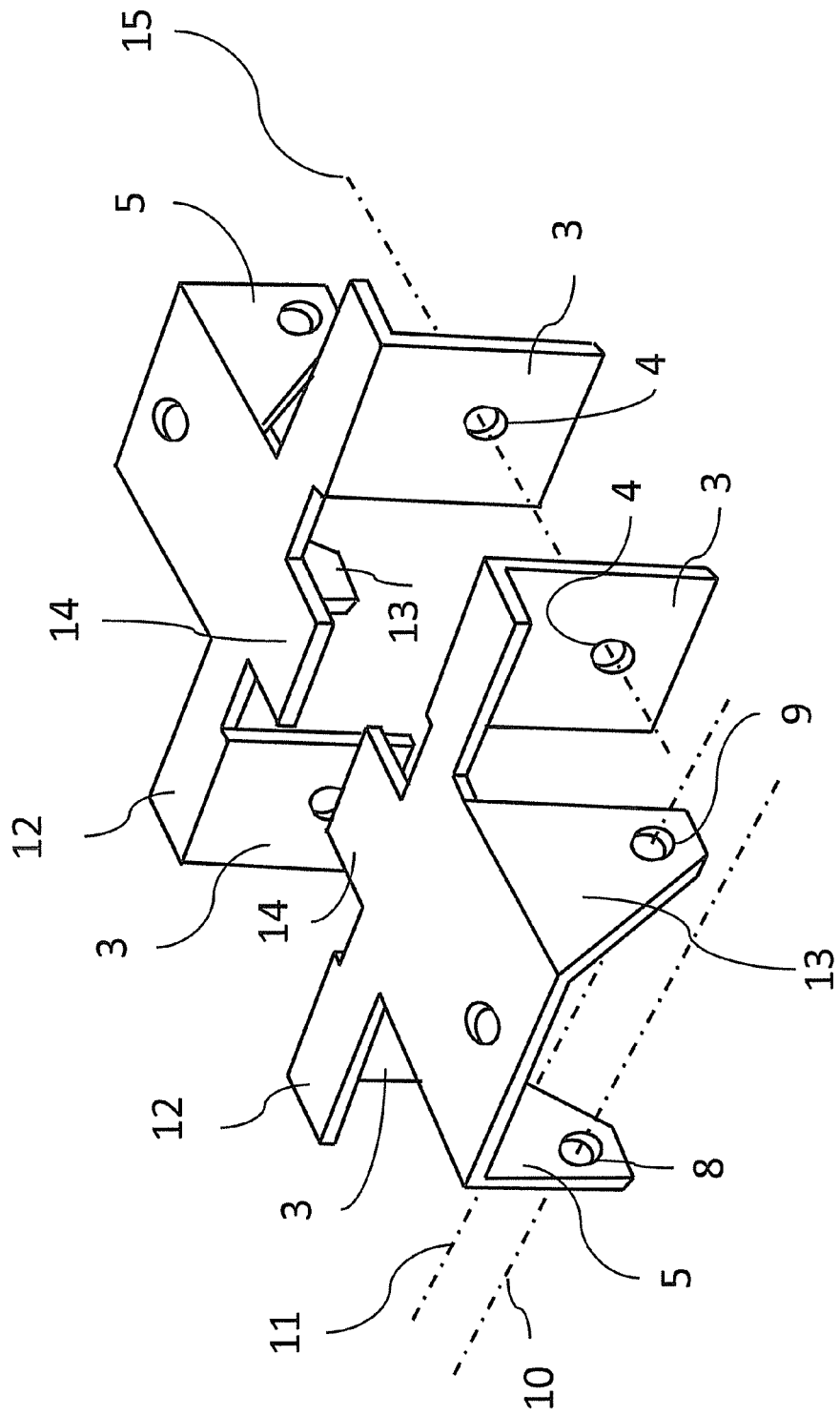
FIG. 4 is a perspective view showing two opposed ones of the brackets of FIG. 3, having specific fastening holes aligned while other fastening holes are offset from each other.

With further reference to FIGS. 4 and 5, fastening holes 4 in transverse tabs 3 of bracket 12 are positioned to straddle blocking brace 17 so as to provide a stable and secure line of compression blocking. The straddle position of fastening holes 4 allows for a bolted fastener on each side of blocking brace 17 which will resist forces that try to twist the roof system imposed by destructive torsion events. Similarly, the bolted fasteners straddling the blocking brace also provide resistance to the destructive forces imposed by seismic events.

Figure 6:
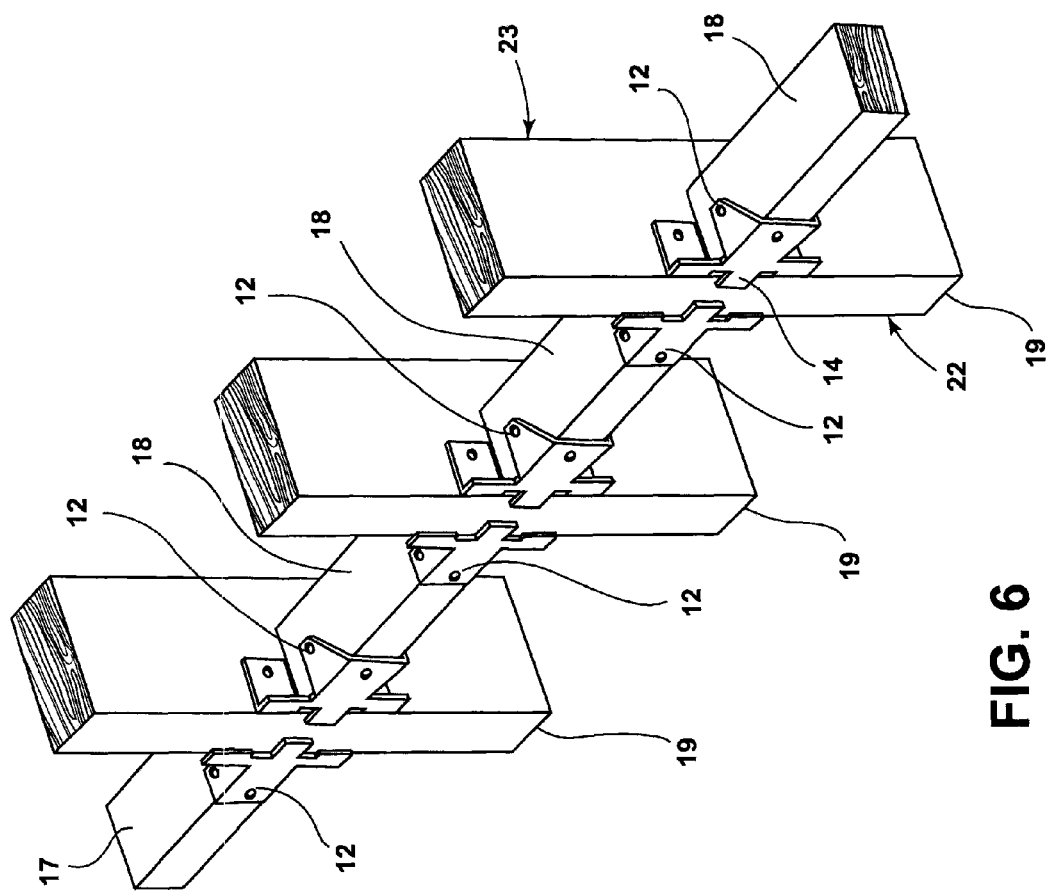
FIG. 6 is an end perspective view of a series of blocking brace subassemblies installed in a wall system to form a line of compression blocking.

Referring to FIG. 6, an exemplary application of the present disclosure is installed in a series of vertical wall elements 19 such as is common in stud wall construction. A line of compression blocking includes multiple blocking braces 18 and multiple blocking brace brackets 12, with each extension tab 14 of the brackets 12 directly contacting an outer or first surface 22 of one of the vertical wall elements 19 and extending past an edge face or second surface 23 of one of the vertical wall elements 19.

Each blocking subassembly such as shown in the Figures herein provides builders with an improved method of securing limber trusses in place because they can be precut and preassembled so that as two trusses are placed next to each other in a roof system, the blocking brace subassemblies can be positioned and tacked into place to temporarily stabilize the trusses. The trusses can be measured and marked while they are on the ground for the proper locations of the blocking brace subassemblies. As the entire truss system is constructed in place, the blocking brace subassemblies will ensure that the entire roof truss system is stabilized until roof decking can be installed. The blocking brace subassemblies also ensure proper spacing between trusses and maintain parallelism between adjacent trusses. Furthermore, the blocking brace subassemblies of the present disclosure provide support for the roof decking edges aligned transverse to the trusses.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A subassembly bracing adjacent structural elements of one of a roof and a wall, the subassembly comprising:
    a plurality of blocking braces disposed between the adjacent structural elements
    that are aligned with each other to form a line of compression blocking that extends perpendicularly to the structural elements, each blocking brace of the plurality of blocking braces is oriented transverse to the adjacent structural elements and extends between two opposite ends that abut the adjacent structural elements;
    a bracket disposed on and fixed to each of the two opposite ends of each blocking brace of the plurality of blocking braces, the bracket including:
        a flange portion positioned in direct contact with a surface of one of the blocking braces of the plurality of blocking braces; and
        at least one tab extending integrally from and oriented transverse to the flange portion, the at least one tab directly contacting one of two opposed surfaces of one of the adjacent structural elements and defining a fastening hole spaced from one of the blocking braces; and
    a bolted connection interconnecting opposing brackets disposed adjacent the two opposed surfaces of each of the adjacent structural elements wherein the fastening hole defined by the tab of each of the opposing brackets is aligned and receives a bolt that extends through the fastening holes of the tabs of the opposing brackets and one of the adjacent structural elements to unitize the subassembly and provide increased compression strengthening and torsion resistance between the adjacent structural elements.

2. The subassembly of claim 1, further comprising:
    first and second tabs disposed on opposing sides of the flange portion of the bracket that are parallel to one another and transverse to both the flange portion of the bracket and the at least one tab.

3. The subassembly of claim 2, wherein the at least one tab is a third tab and a fourth tab that straddle one of the blocking braces and that are aligned with one another to directly contact one of the two opposed surfaces of one of the adjacent structural elements.

4. The subassembly of claim 1, wherein the bracket includes:
    an extension tab oriented parallel to the flange portion of the bracket and aligned with the surface of the one of the blocking braces, the extension tab extending freely over a first surface of one of the adjacent structural elements.

5. The subassembly of claim 3, wherein a receiving channel is defined between the flange portion of the bracket and both of the first and second tabs, one of the blocking braces fitting into the receiving channel.

6. The subassembly of claim 5, wherein each blocking brace is one of a 2×4, a 2×6, a 2×8, a 2×10 or a 2×12 member received in the receiving channel.

7. The subassembly of claim 1, wherein each blocking brace is made of non-wood material, including fiber board, composites, plastic, or metal.

8. The subassembly of claim 2, wherein the first and second tabs contact opposed side faces of one of the blocking braces and are each oriented transverse to the surface contacted by the flange portion of the bracket, each of the first and second tabs being secured to one of the blocking braces using a fastener extending through an aperture created in each of the first and second tabs.

9. The subassembly of claim 8, wherein the aperture created in each of the first and second tabs are located with offset alignment axes respective to each other to prevent fastener interference.

* * * * *